United States Patent [19]
Hwang

[11] Patent Number: 5,435,949
[45] Date of Patent: Jul. 25, 1995

[54] ARTIFICIAL SCENIC ROCK AND ITS MANUFACTURING METHOD

[76] Inventor: Chuan-Ho Hwang, 1F, No. 3, Lane 4, Section 3, Chi-Lung Road, Taipei, Taiwan

[21] Appl. No.: 110,062
[22] Filed: Aug. 20, 1993
[51] Int. Cl.⁶ ............................................. B44F 9/04
[52] U.S. Cl. ..................................... 264/51; 264/220; 428/15
[58] Field of Search ..................... 428/15; 264/51, 220

[56] References Cited

U.S. PATENT DOCUMENTS

| | | | |
|---|---|---|---|
| 3,924,037 | 12/1975 | Sullivan | 428/15 |
| 3,950,477 | 4/1976 | Di Giacomo | 428/15 X |
| 4,085,246 | 4/1978 | Buser et al. | 428/15 X |
| 4,734,302 | 3/1988 | Baskin | 428/15 |
| 4,847,026 | 7/1989 | Jarboe et al. | 428/15 X |

*Primary Examiner*—Henry F. Epstein
*Attorney, Agent, or Firm*—W. Wayne Liauh

[57] ABSTRACT

An artificial scenic rock made using a die-casting process and from a water-curable material such as cement or gypsum, water, and a polymer-based foaming agent. The artificial scenic rock is made first by spraying a color primer on the inner surface of a die casting mould. Then a filler, which was prepared by first mixing about 0.1 to 1 part of the polymer-based foaming agent with about 30 to 60 parts of water in an agitator then adding about 100 parts of the water curable water material while under agitation, is poured into the die casting mould. After hardened and released from the die casting mould, the final product has a natural rock-like color with appropriate texture and features similar to those of a real rock. The polymer-based foaming agent allows the artificial scenic rock of the present invention to be a solid and thus assumes better resemblance of a real rock, but with substantially reduced weight. The color primer layer prevents air bubbles and/or cavities to be exposed on the surface of the artificial rock.

4 Claims, 1 Drawing Sheet

ARTIFICIAL SCENIC ROCK AND ITS MANUFACTURING METHOD

FIELD OF THE INVENTION

The present invention relates to an artificial scenic rock and its manufacturing method.

BACKGROUND OF THE INVENTION

The present invention relates to an artificial scenic rock and its manufacturing method. More particularly, the present invention relates to a kind of rock which has a lighter weight than that of a real rock, is easy to transport and to put into assorted applications, and is fireproof, heat-resistant, and has the same in texture, feature and color as the real one.

Accordingly, the modern life in the crowded urban area within a small area is limitied to deal with the grey high-rise building all day long. Although the indoor decoration can be made to look luxurious, it has the defect that it lacks the natural and warm looking. Therefore, many architectural designers have been stimulated to adopt the natural scenic design viewpoint and to use the natural material coming from mountain or seashore for making our living and business environments more beautiful and comfortable. This kind of decoration not only needs large manpower is expensive and makes the indoor decoration a wasteful extravagant undertaking, it also exhausts the natural resources and destroys the natural scenic spot. Meanwhile, the decoration using the natural heavy rock material will endanger the structure of the architecture whether it is installed indoor or on the top of the building without consideration of weight factor of the decorating rock. It forced the manufacturer to replace the real rock decoration with the artificial rock material made of polymers such as epoxy resin. Although this kind of replacement offers the convenience on transportation because of its light weight, its texture and features are quite different from real material and resulted in unreal and degraded visual effect. Furthermore, the number of buildings on fire is increasing nowadays, and the usages of plastics, resin and wooden combustible decorating material are the major factors accelerating the spread of fire. Based on these considerations and the fact that these kinds of materials are not biodegradable and are likely to pollute the environment whatever the wasting method used including bury or incineration. These kinds of materials are not an appropriate decorating material and cannot benefit the public.

Knowing of the fact that currently available decorating materials do not offer modern people with cost effective, environmental protective and fire-resisting effects, the inventor, who has a long period of working experiences on product design and manufacture, has done a series of researches and modifications through continuous testing and making his best efforts in this work and developed the present invention.

SUMMARY OF THE INVENTION

The main purpose of the present invention is to provide a kind of scenic rock, and the method of manufacturing therefore, which has the same characteristics as real rocks in shape, texture, feature and color.

The other purpose of the invention is to provide a kind of scenic rock and the method of manufacturing therefore, which has only 30% of the weight as the zeal stone at the same volume, is easy to transport and to put into application and will reduce the load of the architecture designs so as to maintain the strength and lifetime of the architecture.

Another purpose of the invention is to provide a kind of scenic rock and the method of manufacturing therefore, which is easy to fabricate, can reduce the manufacturing cost and maintain the natural scenic and ecological environment, and has the fire and heat resisting effect.

The above and other objects, features, and advantages of the present invention will become more apparent from the following description when take in conjunction with the accompanying drawing in which preferred embodiments of the present invention are shown by way of illustrative example.

DESCRIPTION OF THE PREFERRED EMBODIMENTS

Figure 1:
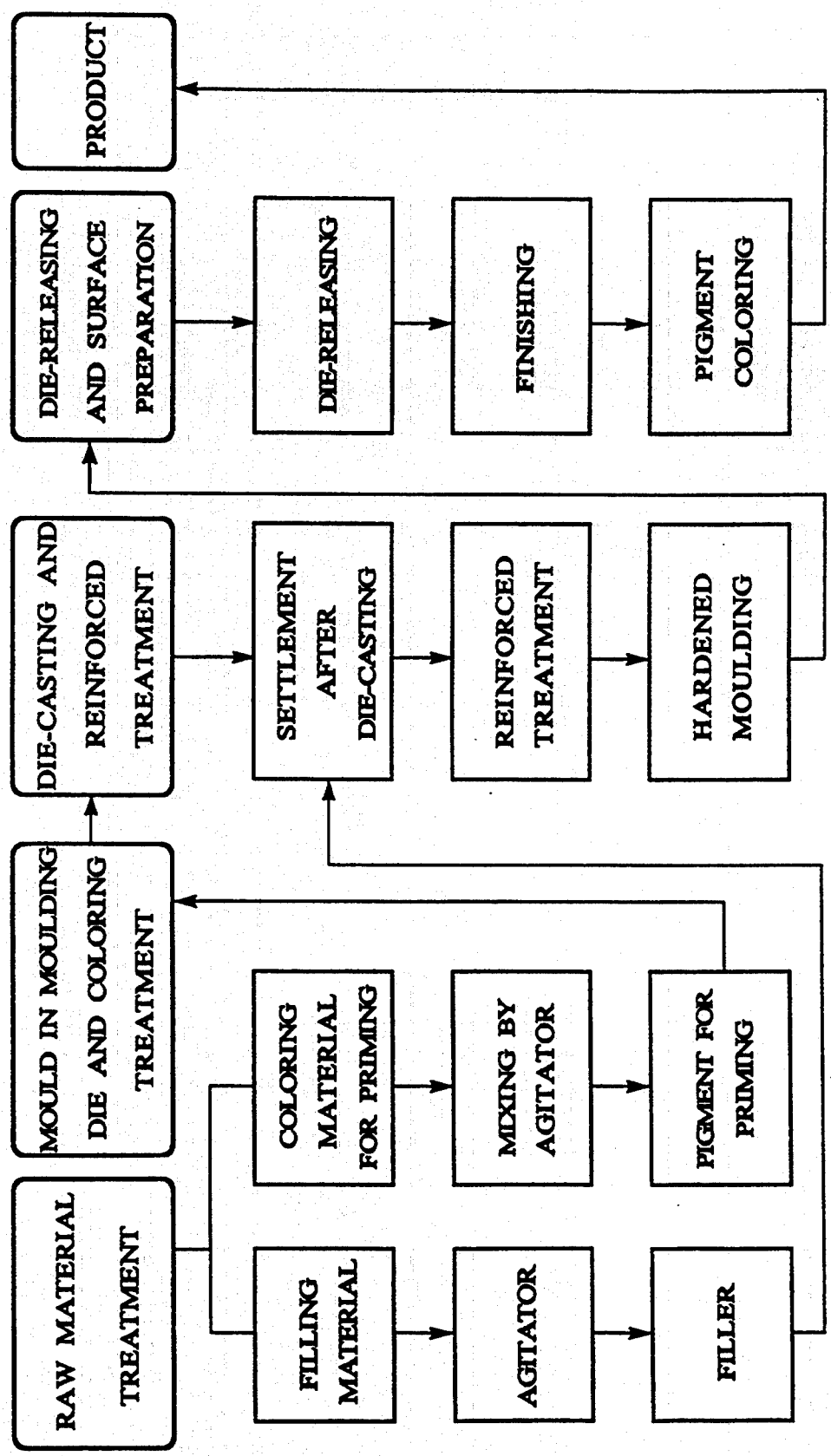
FIG. 1 shows a flow diagram which is a brief description of the present invention.

Referring now to the flow diagram, the present invention, the artificial scenic rock and its manufacturing method, is approximately consisted of (1) raw material treatment (2) mould in moulding die and coloring treatment (3) die casting and reinforced treatment (4) die-releasing and surface preparation. The procedures of the embodiments are described in detail as follows:

1. Raw material treatment:

The present invention is mainly made of some 100 parts of cement, which is a water-curable material, some 0.1 to 1 part of polymer-based foaming agent and some 30 to 60 parts of water at the basis of weight. But, it can also be added a suitable quantity of coloring agent to the undercolor so as to simulate color of the real rock, in which, said polymer-based foaming agent shall be a series of homopolymer or copolymer that is stable and made from $C_1$ to $C_{12}$ alkyl-based, ethylene type carboxylic acid monomer and its salt.

In case of preparation of the product, firstly put said foaming agent and water into the agitator under a speed of about 250 to 650 rpm and agitate for 2 to 4 minutes, and then add raw material such as cement and colors, agitate for 3 to 6 minutes until the foaming agent is completely foamed and mixed homogeneously with cement to form a foamed filling material, in which, on account of the face that the density of cured product shall become smaller while the volume of foamed cement-based filling material is increased and then the tensile strength shall be decreased, the usage of foaming agent shall be controlled to adjust the air content in the foamed cement by means of maintaining weight of foamed cement after curing process approximately at one-third of the real rock at the same volume (i.e. air content is about 33%) so as to obtain light weight scenic rock with better tensile strength. The follow are some examples of test data relating to the quantity of foaming agent used, air quantity and tensile strength according to the present invention:

| foaming agent used, % | air quantity | tensile strength after 28 days, Kgf/cm² |
|---|---|---|
| 0.2 | 31.5 | 29 |
| 0.4 | 43.2 | 17 |
| 0.6 | 48.6 | 12 |

| foaming agent used, % | air quantity | tensile strength after 28 days, Kgf/cm² |
|---|---|---|
| 1.0 | 57.7 | 7 |

2. moulding in rubber die and coloring treatment:

According to the present invention, the rubber die with the shape of the real rock is to be finished in advance before pouring raw material into the die so as to ensure the surface of the artificial scenic rock having the same features as the real one and to prevent bubble from existing on the surface of the product or to prevent from incurring defects such as cracks on the surface after releasing the die. The colors for finishing are approximately consisted of 3 parts of cement or gypsum, 1 part of nonwater-curable inorganic material (which can comprise a single material or at least two premixed materials selected from the following materials: rock powder or calcium carbonate, silicon sand, soapstone, talc, diatomaceous earth, clay, silica powder, flyash, silicon powder, kaolin, and blast furnace slag) and a suitable quantity of thick coloring solution for primer coating that was made by premixing coloring stuff and water so as to paint or spray homogeneously on the inner wall of the rubber die for preventing from cracking and shall meet the requirements of the scenic rock appearance and texture being the same as real rocks in the present invention color can be changed depending on color of the real rock to be simulated.

3. Die casting and reinforced treatment:

After coloring finish, raw material of foamed cement is slowly poured into the rubber die until all concave surfaces of the die are completely filled with foamed cement uniformly to expel air bubbles which may be from remaining on the wall of the rubber die and to prohibit the defect resulting from bubble holes on the surface of the product. In case of fabricating large volume or lengthy product, steel sack, bar, or net may be inserted into the semi-hardened foamed cement and placed at the center portion of the rubber die depending on the actual volume or length necessary while the die has settled for about 1 hour or foamed cement is going to be semi-hardened and then uniformly apply newly-made foamed cement to the interface existed due to the insertion of steel bar or net, in which, the steel bar or net may be inserted into the rubber die only after foamed cement is semi-hardened, or the steel bar, rack, or net may settle into the bottom of the rubber die and cause outer surface of the product to have a slight visible shadow of the steel rack. Furthermore, according to the present invention, the shape of the product is approximately simulated from the natural rock or other carving rock crafts. To achieve this purpose the fabricating die of said natural rock or the carving rock crafts can be preferably made of rubber which is a soft and durable material, on the account that the use of rubber allows the final product to duplicate the dedicated structure and figure of natural rocks or crafts clearly and meet the look-like duplicative purpose.

4. Die-releasing and surface preparation:

After die-casting and the reinforcement treatment, the artificial scenic rock according to the present invention is approximately settled for 24 hours and is released from the die after being completely hardened and solidized. The product after the die-releasing step can be further finished according to the necessity. Besides, it can proceed with surface color-spraying or—painting operation so as to duplicate the appearance, color and feature of natural rocks in case that the surface of the product needs to be enhanced for its color or to have at least two kinds of color. Based on the above-mentioned descriptions, the present invention, the artificial scenic rock, can not only duplicate the scenic rock with similar texture, appearance, feature and color as natural rocks they also reduce the cost of decoration and labors for transportation and carriage. Therefore, the product according to the present invention is time-saving, effective on application, fire-proofing and light weight, and they can reduce the burden on decoration on architecture, maintain lifetime and safety of the decorated architecture and beautify of the high-rise building area through said decoration design with the scenic rocks according to the present invention. Thereafter, the urban building can also be equipped with the natural scenery consisted of nature-like forest and coast with trees and rocks and meet the multiple purposes including beautification for our living environment and maintaining our ecological scenery. Therefore, the present invention is very valuable to put into practice. It has no doubt on its practicability. Furthermore, ideas, theories, techniques and fabricating processes similar to the present invention are not known to have been developed in the field. Therefore, the present invention meets the novelty requirements for a patent. And, it is evident that many modifications, substitutions and variations will be apparent to those skilled in the art. Accordingly, the invention is intended to embrace all such modifications, substitutions and variations as fall within the spirit and scope of the appended claims.

What is claimed is:

1. A method for manufacturing light weight artificial scenic rocks having an appearance of a real rock, said method comprising the steps of:
    (a) preparing a filler by first mixing 0.1 to 1 part of a foaming agent with 30 to 60 parts of water on weight basis in an agitator for 2 to 4 minutes at a speed of 250 to 650 rpm, then adding 100 parts of cement by weight, while agitating, so as to form a light weight filler of foamed cement having a plurality of air bubbles dispersed therein;
    (b) obtaining a die casting mould made of a soft rubbery material, said die casting mould having an inner surface with a plurality of concave surfaces;
    (c) spraying a color primer uniformly on said inner surface of said rubbery die casting mould so as to form a color primer layer which can be subsequently painted;
    (d) slowly pouring said filler prepared in step (a) into said die casting mould until all of said concave surfaces are completely filled so as not to leave any defect on an outer surface of said scenic rock, continuing pouring said filler, and inserting a reinforcement material inside said filler, after said filler is semi-hardened so as to improve its tensile strength;
    (e) performing a die-releasing and surface preparation procedure by releasing said die after said filler has been hardened to form a precursory product; and
    (f) performing a pigment coloring operation by spraying or painting on a surface of said precursory product so as to obtain a final product having an outer layer with a desired color and texture as a real rock.

2. The method for manufacturing artificial scenic rocks according to claim 1 wherein said moulding die is made of a soft and durable material and said color primer is uniformly painted on said inner surface thereof of said moulding die to prevent the outer layer of said scenic rock from cracking or having bubbles and/or cavities so as to ensure that said final product has the appearance of a real rock.

3. The method for manufacturing artificial scenic rocks according to claim 1 wherein said reinforcement material is inserted into said filler only after said filler has been become semi-hardened.

4. The method for manufacturing artificial scenic rocks according to claim 1 wherein said die-releasing and surface treatment procedure includes a mould hardening time of about 24 hours.

* * * * *